UNITED STATES PATENT OFFICE 2,626,219

ANTISLIP ICE SOLVENT PRODUCT AND PROCESS

George B. Wagner, Holbrook, Mass., assignor to Normandy Chemical Corporation, Muskegon, Mich., a corporation of Michigan No Drawing. Application January 3, 1949,
Serial No. 69,060

2 Claims. (Cl. 106—36)

This invention relates to an anti-slip ice solvent product comprising wood sawdust impregnated with an ice solvent salt. It is well known that huge quantities of wood sawdust are present as a waste product in many lumbering and furniture factory regions and further large quantities are being produced daily. Furthermore, this sawdust is not only a waste product but its disposal has become a considerable problem for which no solution has been found. The primary object of my invention is the production of a useful anti-slip ice solvent product from this waste sawdust.

I have discovered that when sawdust is impregnated with an ice solvent salt and spread upon an icy or slippery frozen surface, the salt in contact with the moisture immediately attacks and disintegrates the ice to honeycomb it and change the smooth slippery surface into a rough and highly frictional surface. This structural change eliminates the slippery surface and, together with the presence of the sawdust per se, provides the required traction for vehicular and pedestrian traffic. The salt impregnated within the sawdust furthermore continues thus to function over a long period of time during which the icy condition is thoroughly eradicated. A further object of the invention resides in the production of a product of this nature and which will perform these functions.

At present the only available anti-slip ice solvent is rock salt which is both expensive and destructive. Rock salt is relatively heavy and so expensive that it cannot be used commercially on areas of appreciable size, and the destructive effect of the resulting brine on masonry, grass, metal, etc. is prohibitive.

I have furthermore discovered that a salt brine which has been neutralized to a non-acid and non-alkaline condition is non-corrosive to metals and is neutral in its effect on other matter, including masonry, grass, etc. A further object of my invention resides in the production of an improved anti-slip product comprising wood sawdust impregnated with an ice solvent salt thus neutralized and operative to effect the above mentioned benefits without deleterious effects on other matter contacted by the resulting brine.

Calcium chloride is available in large quantities at economical cost and I have found that my process and product function with facility with use of this salt. I shall therefore herein describe my invention more particularly in connection with this salt, although it will be understood that the invention is not thus limited and that other ice solvent salts such as sodium chloride may be employed.

An ideal brine which I have employed in the process embodies calcium chloride dissolved in water to a specific gravity of 1.26 Baumé scale 29.9 and adapted to approach a freezing point of —30° F. The weight of this brine is approximately 10.50 pounds per gallon or 78.7 pounds per cubic foot, and requires approximately 4.14 pounds of calcium chloride per gallon of water at 60° F. The freshly produced brine will be alkaline and I neutralize the same preferably by treating with carbon dioxide gas. The preferred treatment which I have employed includes the placing of a block of Dry Ice (solid $CO_2$) in the brine. The ice sinks to the bottom of the brine and the released $CO_2$ gas boils off through the brine in a manner thoroughly agitating and neutralizing it. The brine can be neutralized by adding a sodium compound, as bicarbonate of soda until a desired alkalinity is reached, although the $CO_2$ treatment is preferable. A test that the brine has approached a neutral state may be made by adding one or two drops of phenol-phthalein indicator to a small sample of the treated brine. When no color results the brine is neutral.

It is preferable to remain on the alkaline side and not approach the acid side. A brine that is acid may be brought back to alkaline by the addition of caustic soda but should be watched closely with a phenol red indicator. After completely neutralizing the brine, sawdust is added in sufficient mass to absorb all the brine and preferably the mixture is maintained at a temperature of 200° F. for a period of ten minutes. At the end of this time any excess liquor is drawn off and the sawdust is completely dehydrated to leave the resulting product substantially dry. At this point the sawdust is completely impregnated with the neutral salt which becomes heat generative when in contact with any moisture contained substance and will remain active on the above formula at —30° F. The density of the brine may be varied and this will vary the functioning activity of the final product.

The treatment of sawdust in the brine may be carried out without applying additional heat but the treating period will then be longer and the impregnation will not be as great and the finished product will not be as effective. Furthermore, the impregnation may be hastened by treating the sawdust in the brine under pressure. The final product is substantially heavier than the original sawdust and will sink in water. A satisfactory impregnation embodies a final product in which the sawdust has an increased weight approximating 50% by the hot process and 36% by the cold process.

While the formula above recited is fully operative as described and quite satisfactory, I have found that a most satisfactory and efficient product is made by using a brine comprising calcium chloride, sodium chromate and caustic soda. This formula when properly prepared is particularly effective against corrosive effects. The brine which I have found most highly satisfactory and effective contains the following ingredients in the proportions given:

125 pounds sodium chromate per 1000 cubic feet of calcium chloride brine plus 29 pounds of caustic soda and neutralized with $CO_2$ gas preferably in solid form. The sodium chromate supplies oxygen to the impregnant and the caustic soda supplies hydrogen, and both act further to neutralize the impregnant.

My improved anti-slip ice solvent is light in weight as compared to rock salt and like ice solvents and operates with an efficiency that permits the treating of relatively large areas at moderate cost. Furthermore, the product continues to function over a long period of time during which the impregnant is gradually given up by the sawdust and sufficient heat generated to continue and complete the melting operation. The destruction of the slippery surface and the addition of the sawdust per se produces a traction superior to any heretofore produced under like conditions and, finally, the invention provides for the productive use of a waste product in large amounts and much saving of life and accidents occasioned by slippery surfaces.

Having thus disclosed my invention what I claim as new and desire to secure by Letters Patent is:

1. A composition of matter for use as an anti-slip agent on ice, said composition consisting of wood sawdust impregnated with a solution consisting of 1000 cubic feet of calcium chloride brine, 29 pounds of caustic soda, 125 pounds of sodium chromate, said solution being substantially neutral.

2. The method of making a composition of matter for use as an anti-slip agent on ice which comprises forming a substantially neutral solution which consists of 1000 cubic feet of calcium chloride brine, 29 pounds caustic soda and 125 pounds of sodium chromate, contacting wood sawdust with the said solution to effect an absorption of the solution by the sawdust, removing the excess liquid from the sawdust, and drying the said sawdust.

GEORGE B. WAGNER.

REFERENCES CITED

The following references are of record in the file of this patent:

UNITED STATES PATENTS

| Number | Name | Date |
|---|---|---|
| 1,141,446 | De Cew | June 1, 1915 |
| 1,787,888 | White | Jan. 6, 1931 |
| 1,915,013 | Ehrhardt | June 20, 1933 |
| 2,026,121 | Collings | Dec. 31, 1935 |
| 2,204,466 | Barnes | June 11, 1940 |
| 2,210,946 | Moore | Aug. 13, 1940 |
| 2,410,910 | Wait | Nov. 12, 1946 |